US006518387B2

(12) United States Patent
Kuo et al.

(10) Patent No.: US 6,518,387 B2
(45) Date of Patent: *Feb. 11, 2003

(54) SOYBEAN-BASED ADHESIVE RESINS AND COMPOSITE PRODUCTS UTILIZING SUCH ADHESIVES

(75) Inventors: Monlin Kuo, Ames, IA (US); Deland J. Myers, Ames, IA (US); Howard Heemstra, Ames, IA (US); Daniel Curry, Ames, IA (US); Daniel O. Adams, Salt Lake City, UT (US); Douglas D. Stokke, Story City, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/945,978

(22) Filed: Sep. 4, 2001

(65) Prior Publication Data

US 2002/0026025 A1 Feb. 28, 2002

Related U.S. Application Data

(63) Continuation of application No. 09/363,620, filed on Jul. 29, 1999, now Pat. No. 6,306,997.

(51) Int. Cl.$^7$ .............................. C08H 5/04; C08J 3/03; C08L 89/00; C08G 8/00
(52) U.S. Cl. ...................... 527/100; 527/103; 527/403; 524/13; 524/14; 524/596; 524/25; 524/598; 528/129; 528/230; 528/258
(58) Field of Search ................................ 527/100, 103, 527/403; 524/14, 13, 25, 596, 598; 264/109, 125, 239, 241; 528/129, 258, 230

(56) References Cited

U.S. PATENT DOCUMENTS

| | | | |
|---|---|---|---|
| 2,368,466 A | 1/1945 | Golick et al. | 20/89 |
| 2,620,316 A | 12/1952 | Ritson | 260/6 |
| 2,817,639 A | 12/1957 | Ash et al. | 260/4 |
| 3,153,597 A | 10/1964 | Weakley et al. | 106/139 |
| 3,274,042 A | 9/1966 | Gilboe et al. | 156/328 |
| 3,706,950 A | 12/1972 | Stephan et al. | 156/317 |
| 3,905,921 A * | 9/1975 | Cone et al. | 156/78 |
| 3,927,235 A | 12/1975 | Chow | 428/302 |
| 4,046,955 A | 9/1977 | Bye | 428/479 |
| 4,082,903 A | 4/1978 | Chow | 428/528 |
| 4,165,305 A | 8/1979 | Sundie et al. | 428/528 |
| 4,192,783 A | 3/1980 | Bomball et al. | 106/103 |
| 4,285,848 A | 8/1981 | Hickson | 528/163 |
| 4,352,692 A | 10/1982 | Krinski et al. | 106/124 |
| 4,421,564 A | 12/1983 | Graham et al. | 106/154 R |
| 4,474,694 A | 10/1984 | Coco et al. | 426/656 |
| 4,537,941 A | 8/1985 | Kambanis et al. | 527/403 |
| 4,554,337 A | 11/1985 | Krinski et al. | 527/201 |
| 4,594,384 A | 6/1986 | Kilpelainen et al. | 524/705 |
| 4,687,826 A | 8/1987 | Steinmetz et al. | 527/201 |
| 4,689,381 A | 8/1987 | Krinski et al. | 527/201 |
| 4,713,116 A | 12/1987 | Krinski et al. | 106/154.1 |
| 4,882,112 A | 11/1989 | Maki et al. | 264/109 |
| 4,942,191 A | 7/1990 | Rogers | 524/17 |
| 5,162,392 A | 11/1992 | Wool et al. | 523/128 |
| 5,202,403 A | 4/1993 | Doering | 527/403 |
| 5,241,795 A | 9/1993 | Giroux et al. | 52/DIG. 9 |
| 5,371,194 A | 12/1994 | Ferretti | 530/348 |
| 5,574,134 A | 11/1996 | Waite | 530/328 |
| 5,593,625 A | 1/1997 | Riebel et al. | 264/115 |
| 5,611,882 A | 3/1997 | Riebel et al. | 156/272.2 |
| 5,635,123 A | 6/1997 | Riebel et al. | 264/125 |
| 5,705,542 A | 1/1998 | Roffael et al. | 524/74 |
| 5,756,599 A | 5/1998 | Teodorczyk | 525/491 |
| 5,766,331 A | 6/1998 | Krinski et al. | 106/157.2 |
| 5,777,015 A | 7/1998 | Jakob et al. | 524/354 |
| 5,866,141 A | 2/1999 | Tojo et al. | 424/400 |
| 5,866,642 A | 2/1999 | McVay et al. | 524/74 |
| 5,880,183 A | 3/1999 | Yeo | 524/13 |
| 6,028,133 A | 2/2000 | Peek et al. | 524/276 |
| 6,306,997 B1 * | 10/2001 | Kuo et al. | 527/100 |

OTHER PUBLICATIONS

"Modified Soy Protein Adhesive," *AgBiotech Reporter* pp. 19–20 (Sep. 1998).

"Resin Looks, Works Like a Chemical, But It's Soybean," *Des Moines Register* (Sep. 27, 1998).

Fitzgerald, "Cornstalks Hold an Answer For Dwindling Wood Supplies," *Des Moines Register* (Sep. 7, 1998).

"Standard Test Methods for Evaluating Properties of Wood–Base Fiber and Particle Panel Materials," American Society for Testing and Materials, ASTM Standard D 1037–96a:136–165 (1978). Month not available.

Christiansen et al., "Differential Scanning Calorimetry of Phenol–Formaldehyde Resols," *J. Appl. Polymer Science* 30:2279–2289 (1985). Month not available.

(List continued on next page.)

*Primary Examiner*—P. Hampton-Hightower
(74) *Attorney, Agent, or Firm*—Nixon Peabody, LLP

(57) ABSTRACT

The present invention relates to a soybean-based adhesive resin including a soybean flour and a cross-linking agent. The cross-linking agent is reacted with the functional groups in the soybean flour to form an adhesive resin. The present invention also relates to a method of making a soybean-based adhesive resin. This method involves providing an aqueous solution of soybean flour and adding a cross-linking agent to the solution under conditions effective to cross-link the soybean flour so that an adhesive resin is formed. Also disclosed is a composite product which includes particulate plant material and the soybean-based adhesive resin. The adhesive is prepared by reacting the cross-linking agent with the functional groups in the soybean flour. The present invention also relates to a method of making a composite product by providing particulate plant material and applying the soybean-based adhesive resin to the particulate plant material.

10 Claims, No Drawings

OTHER PUBLICATIONS

Detlefsen, "Blood and Casein Adhesives for Bonding Wood," *Adhesives from Renewable Resources* ACS Symposium Series 385, pp. 445–452, Am. Chem. Soc., Washington D.C. (1989).

Kuo et al., "Properties of Wood/Agricultural Fiberboard Bonded with Soybean–Based Adhesives," *For. Prod. J.* 48(2):71–75 (1998).

Lambuth, "Blood Glues," *Handbook of Adhesives*, pp. 158–169, Reinhols Publishing Corp., N.Y. (1962).

Kuo et al., "Composite Panels from Agricultural Reside Bonded with Soybean–Based Resins," 1999 Ag Fiber Technology Showcase, Memphis, TN (Aug. 18–20, 1999).

Stokke et al., "Composite Products From Juvenile Hybrid Poplars Bonded with Crosslinked Soy Adhesives," International Conference on Effective Utilization of Plantation Timber, Chi–Tou, Taiwan, R.O.C. Bulletin No. 16 (May 21–23, 1999).

* cited by examiner

SOYBEAN-BASED ADHESIVE RESINS AND COMPOSITE PRODUCTS UTILIZING SUCH ADHESIVES

This is a continuation of U.S. Patent Application Ser. No. 09/363,620, filed Jul. 29, 1999, now U.S. Pat. No. 6,306,997.

FIELD OF THE INVENTION

The present invention relates to a soybean-based adhesive resin, composites products made with that adhesive, and a method of manufacturing such adhesives and composites products.

BACKGROUND OF THE INVENTION

Urea-formaldehyde (UF) resins and other formaldehyde-condensed resins, which are toxic petroleum-based adhesives, have been used as wood adhesives for many years. However, the level of formaldehyde gas emission from UF-bonded products is heavily regulated by law, particularly with respect to indoor use. In addition, the high cost of most formaldehyde-condensed resins and the poor moisture resistance of UF resins have resulted in the need for alternative wood adhesives.

There is a growing interest to develop wood adhesives from renewable substances to reduce the dependency on petroleum-based chemicals and to expand the non-food use of agricultural commodities. In particular, uncertainty in future supplies of petroleum-derived chemicals and stringent regulations on toxic emissions from building materials bonded with certain synthetic resins have compelled the forest products industry to reevaluate wood adhesives from renewable substances. The agriculture industry also is eager to invest in researching nonfood industrial uses of agricultural products to expand their markets. A significant challenge is to develop resin adhesives from renewable substances meeting stringent performance requirements at reasonable costs.

As an alternative to petroleum-based adhesives, protein glues, such as casein, blood, and soy glues, reached their peak use in the 1960s and faded out in the 1970s. Most of the important research on formulating wood adhesives with protein occurred before 1960.

U.S. Pat. No. 2,817,639 to Ash et al. disclosed a plywood glue containing high blood solids blended with a commercial phenol-formaldehyde (PF) resin and sodium silicate. This required a specific mixing procedure to avoid a high viscosity problem. Lambuth, "Blood Glues," in *Handbook of Adhesives*, I. Skeist, ed., Reinhols Publishing Corp., NY (1962) discloses the interactions between different types of PF resins and blood albumin. PF resins of simple structure behave much the same as aromatic alcohols, causing a change in blood glue consistency from gelatinous to granular, often accompanied by a reduction in viscosity. Alkaline phenolic resins of moderate complexity do not disperse blood proteins to a great extent. Highly complex and reactive PF resins, however, cause gelation of blood proteins, creating a major viscosity problem at any mixing combination. U.S. Pat. No. 2,368,466 to Golick et al. disclosed an exterior phenolic plywood glue containing up to 70% dried blood. This glue was prepared by first reacting cresol and casein with formaldehyde at room temperature to form an emulsion. This reaction was catalyzed by $NH_4OH$. Subsequently, this emulsion was mixed with blood albumin at room temperature to form a smooth glue. The casein did not react with PF resins, and the fluid glue contained finely precipitated particles of blood albumin-phenol-aldehyde complex.

U.S. Pat. No. 3,153,597 to Weakley et al. disclosed moisture resistant plywood adhesives by cross-linking casein with dialdehyde starch.

U.S. Pat. No. 5,593,625 to Riebel et al. describes methods of preparing a legume-based thermosetting resin for producing rigid biocomposite materials. This resin was formulated by cross-linking soy flour with methyl diphenyl isocyanate and mixing the resin with paper fibers in a ratio about 4:6. A molded composite product was produced.

U.S. Pat. No. 5,371,194 to Ferretti describes a method of synthesizing a thermosetting resin from a mixture of protein and carbohydrate by ammoniation. This ammoniated resin was developed as a moisture resistant binder for pelletizing coal fines.

Further, the use of soy protein isolates and phenol-resorcinol-formaldehyde (PRF) in combination for lumber finger jointing is currently under mill trial studies. In this finger jointing system, the soy protein isolates and PRF are separately applied onto different fingers, and upon joining these fingers, interactions between soy protein and PRF first immediately cause the adhesive to gel and, eventually, the adhesive is completely cured in several hours.

Although great effort has been undertaken to develop protein glues, such glues were slow curing and had poor moisture resistance. As a result, the art sought to develop synthetic resin adhesives. Detlefsen, "Blood and Casein Adhesives For Bonding Wood," in *Adhesives from Renewable Resources*, Hemingway et al., eds., ACS Symposium Series 385, Am. Chem. Soc., Washington, D.C. (1989).

The present invention is directed to overcoming the deficiencies in protein glues and their use in manufacturing composite products.

SUMMARY OF THE INVENTION

One aspect of the present invention relates to a soybean-based adhesive resin including a soybean flour and a cross-linking agent. The cross-linking agent is reacted with the functional groups in the soybean flour to form an adhesive resin.

The present invention also relates to a method of making a soybean-based adhesive resin. This method involves providing an aqueous solution of soybean flour and adding a cross-linking agent to the solution. The cross-linking agent is added to the solution under conditions effective to cross-link the soybean flour and the cross-linking agent to form an adhesive resin.

Another aspect of the present invention relates to a composite product which includes particulate plant material and the soybean-based adhesive resin. The adhesive is prepared by reacting the cross-linking agent with functional groups in the soybean flour.

The present invention also relates to a method of making a composite product. This method involves providing particulate plant material and applying the soybean-based adhesive resin to the particulate plant material. The adhesive is prepared by reacting the cross-linking agent with the functional groups in the soybean flour.

The soybean-based adhesive resin of the present invention provides a low-cost wood adhesive from a renewable resource as an alternative to petroleum-based adhesives. This resin can be used as an exterior adhesive in the manufacture of wood composite panel products and can replace urea-formaldehyde resins for interior fiberboard, alleviating formaldehyde emissions and poor moisture resistance problems.

DETAILED DESCRIPTION OF THE INVENTION

The present invention relates to a soybean-based adhesive resin including a soybean flour and a cross-linking agent. The cross-linking agent is reacted with the functional groups in the soybean flour to form an adhesive resin.

Preferably, the soybean flour contains more proteins than carbohydrates.

Most preferably, the soybean flour is defatted. Defatted soybean flour is commercially available and is obtained by grinding soy flakes after hexane extraction for soy oil. After hexane extraction, defatted soybean flour typically has the following moisture-free chemical composition:

| | |
|---|---|
| Protein | 50.0% to 55.0% |
| Fat | 1.4% to 2.0% |
| Fiber | 3.0% to 4.5% |
| Ash | 5.0% to 7.0% |
| Carbohydrates | 34.0% to 37.0% |

Most preferably, after soy oil extraction, defatted soybean flour has the following moisture-free average chemical composition:

| | |
|---|---|
| Protein | 53.4% |
| Fat | 1.6% |
| Fiber | 3.4% |
| Ash | 6.0% |
| Carbohydrates | 35.6%. |

The cross-linking agent reacts with the functional groups in the soybean flour to form an adhesive resin. Suitable cross-linking agents include phenol-formaldehyde resin, melamine-urea-formalde resins, and mixtures thereof.

The preferred cross-linking agent is a phenol-formaldehyde (PF) resin. In this embodiment, the hydroxymethylol groups ($—CH_2OH$) of the PF resin react with the functional groups of the soybean protein, such as tyrosine and hydroxyl groups (—OH), to form methylene or ether linkages between the soy protein and the PF resin. In addition, the hydroxymethylol groups of the PF resin react with the hydroxyl groups of the soybean carbohydrates to form ether linkages. These condensation reactions between the PF resin and protein and carbohydrates in soy flour occur particularly during curing stages of the soybean-based adhesive at high temperatures. As a result of the condensation reactions, a cross-linked product is formed. More specifically, the hydroxymethylol groups of the PF resin condense with the soy protein forming methylene ($—CH_2$) and ether ($—CH_2O$) linkages, and condense with the soybean carbohydrates forming ether linkages to form the cross-linked product.

Soybean flour, since it contains a relatively large amount of carbohydrates, is not compatible with alkaline PF resins. Specifically, during curing at high temperatures, alkaline PF resins transform carbohydrates into saccharic acids which interfere with polymerization of the PF resin and inhibit condensation reactions between the PF resin and soy flour. However, under the neutral condition the carbohydrates in soybean flour are not converted to saccharic acids. Therefore, the hydroxymethylol groups in the PF cross-linking agent are able to condense with themselves and with the many functional groups in the soybean protein and hydroxyl groups in the soybean carbohydrates to form a cross-linked product.

Soybean flour is a good natural adhesive, but the adhesive bonds so formed are not moisture resistant. Therefore, any level of cross-linking of soybean flour with a PF resin improves the moisture resistance of the adhesive bonds due to the reduced water solubility of cross-linked soybean flour. Preferably, the weight ratio of soybean flour to cross-linking agent in the soybean-based adhesive resin of the present invention is from about 8:2 to about 6:4. Most preferably, the weight ratio of soybean flour to cross-linking agent is about 7:3. The physical properties of wood composite products bonded with such soybean-based adhesive resins are comparable to those of products bonded with pure PF resins; however, the cost of pure PF resins is about three times greater than soybean flour. Therefore, the soybean-based adhesive resin of the present invention is more economical than pure PF resin.

The present invention also relates to a method of making a soybean-based adhesive resin. This method includes providing an aqueous solution of soybean flour and adding a cross-linking agent under conditions effective to cross-link the soybean flour and the cross-linking agent to form an adhesive resin.

The soybean flour may be prepared by methods known to those skilled in the art. A preferred method for preparing the soybean flour solution of the present invention includes dissolving sodium bisulfite in water, adjusting the pH to from about 6.8 to 7.1 with sodium hydroxide, heating the solution to from about 45° C. to about 55° C., adding defoamer, and adding dry soy flour under conditions effective to produce a homogenous solution. Preferably, the solution is heated to about 50° C. Addition of sodium bisulfite during preparation of soy flour solution partially depolymerizes the soy protein by cleaving the disulfide linkages. Cleavage of disulfide bonds reduces the viscosity of the soy solution. Maintaining the soy flour solution at the neutral pH and 50° C. obtains a high solubility of soy flour and avoids protein gelation. Adding defoamers reduces foaming of soy flour solution, making preparation of the soy flour solution easier to handle. Preferred defoamers include cedarwood oil, Sigma antifoam 204, or pine oil. Most preferably, the defoamer is cedarwood oil. Preparation of soy flour in this manner produces a solution at a solid content as high as possible and at a viscosity manageable in the subsequent resin formulation.

A preferred method for preparing the cross-linking agent of the present invention includes combining phenol, formaldehyde, and sodium hydroxide to form a mixture, heating the mixture, refluxing the mixture, and neutralizing the mixture to a pH of about 6.9 to about 7.1. Most preferably, the pH is about 7.

The soybean-based adhesive resin is prepared by cross-linking the proteins and carbohydrates in the soybean flour with the cross-linking agent. Preferably, the cross-linking reaction is carried out at 50° C. by vigorously blending the soybean flour solution and the cross-linking agent.

The soybean-based adhesive resin of the present invention may be prepared in liquid or powder form. In one preferred embodiment, the powder form of the soybean-based adhesive resin of the present invention is prepared by freeze-drying the soybean-based adhesive resin produced by the claimed method and grinding the freeze-dried soybean-based adhesive resin under conditions effective to form a powder soybean-based adhesive resin. In another preferred embodiment, the powder form of the soybean-based adhesive resin of the present invention can be manufactured with a spray drier, resulting in a powder soybean-based adhesive resin of better quality, especially with respect to uniformity in particle size. The powder soybean-based adhesive resin of the present invention is preferred, because it has a long storage life if properly stored.

Another aspect of the present invention relates to a composite product which includes particulate plant material and the soybean-based adhesive resin of the present invention.

Suitable particulate plant materials include wood flakes, wood fibers, plant fibers, and a combination of wood and plant fibers. Useful plant fibers include wheat straw fibers, rice fibers, switchgrass fibers, soybean stalk fibers, bagasse fibers, cornstalk fibers, and mixtures thereof. Preferably, wood fibers are used in combination with plant fibers. The preferred weight ratio of wood to plant fibers when used in combination is from about 2.5:7.5 to about 7.5:2.5, preferably about 5:5. Wood flakes may be produced by procedures known to those skilled in the art (Koch, "Utilization of Hardwoods Growing on Southern Pine Sites," Vol. II, USDA Forest Service, Agriculture Handbook No. 605 (1985), which is hereby incorporated by reference). Fiber furnishes containing wood fiber, plant fiber, or a combination thereof may be produced by procedures known to those skilled in the art (Suchsland et al., "Fiberboard Manufacturing Practices in the United States," USDA Forest Service, Agriculture Handbook No. 640 (1986), which is hereby incorporated by reference). Preferably, wood and plant fiber furnishes are produced by a pressurized double-refining process as described in Example 4. Cornstalk fibers and other plant fibers may also be produced with an atmospheric disk refiner as outlined in Kuo et al., "Properties of Wood/Agricultural Fiberboard Bonded with Soybean-based Adhesives," *For. Prod. J.*, 48:71–75 (1998), which is hereby incorporated by reference.

In another embodiment, the composite product of the present invention further includes a wax emulsion. Wax emulsion or slack wax is used in producing composite panels to improve moisture resistance or, more specifically, to reduce water absorption and water vapor adsorption. For example, a suitable wax emulsion is Cascowax EW-403H (Borden Chemical, Inc., Springfield, Oreg.).

The soybean-based adhesive resin of the present invention is particularly useful for preparing wood composite panel products such as fiberboard, particleboard, plywood, and flakeboard. By utilizing these adhesive resins, moisture resistant and toxic emission-free wood composite products can be produced. In particular, the soybean-based adhesive resin can replace urea-formaldehyde (UF) resin for the production of fiberboard panels for interior applications to alleviate the formaldehyde emission and poor moisture resistance problems. Alternatively, the resin can be used as exterior adhesive resin for the production of construction grade wood composites at a cost of about 50 percent less than phenol-formaldehyde (PF) resin.

Another aspect of the present invention relates to a method of making a composite product. This method involves providing particulate plant material and applying the soybean-based adhesive resin to the particulate plant material. The adhesive is prepared by reacting the cross-linking agent with the functional groups in the soybean flour.

The soybean-based adhesive resin of the present invention may be applied to the particulate plant material by spraying or mechanical mixing in liquid form, or it may be applied in powder form. Preferably, the soybean-based adhesive resin is applied in liquid form to the particulate plant material by a nozzle atomizer or by a spinning-disk atomizer. In another embodiment, the soybean-based adhesive resin is applied to the particulate plant material by first spraying the particulate plant material with the liquid soybean-based adhesive resin of the present invention and then applying a powder form of the soybean-based adhesive resin of the present invention to the particulate plant material. The liquid soybean-based adhesive is used in combination with the powder soybean-based adhesive to reduce moisture content of the particulate plant material. Preferably, the particulate plant material is sprayed with 30% of the desired amount of the soybean-based adhesive in liquid form and the remainder 70% of the desired amount of the soybean-based adhesive in powder form.

The soybean-based adhesive coated particulate plant material is spread to form a mat by procedures known to those skilled in the art (Maloney, *Modern Particleboard and Dry-Process Fiberboard Manufacturing*, Miller Freeman Publications, San Francisco, Calif. (1997), which is hereby incorporated by reference). The formed mat is consolidated to a predetermined thickness with a sufficient pressure at a temperature ranging from about 170° C. to about 190° C. for about 7 to about 15 minutes to obtain the products. Preferably, the mat is pressed at about 190° C. Preferable press time depends on moisture content of the mat. For the mat formed from the particulate plant material sprayed with the soybean-based adhesive in liquid form, a high moisture content in the mat requires a long press time. When the soybean-based adhesive is applied to the particulate plant material in the combination of liquid and powder form, a short press time is sufficient to consolidate the mat. When used in powder form, the soybean-based adhesive resin is mixed with the particulate plant material, and the mixture is filled in a mold and consolidated under a high temperature and pressure to produce shaped composite products. In particular, the powder soybean-based adhesive resin is mixed with the particulate plant material in a weight ratio ranging from about 3:7 to about 2:8, preferably from about 2.5:7.5. The mixture is filled in a mold and consolidated at from about 175° C. to about 200° C., preferably 190° C., for from about eight to about twelve minutes, preferably ten minutes, to obtain compression molded products.

EXAMPLES

Example 1

Preparation of Defatted Soybean Flour Solution

An aqueous solution of defatted soybean flour (Honey Meal, HM90, Mankato, Minn.), which contains about 54 percent protein, 30 percent carbohydrates, 6 percent ash, and 10 percent moisture, was prepared by dissolving 1.25% sodium bisulfite ($NaHSO_3$) in 250 ml water for each 100 grams of moisture-free soy flour. The pH was then adjusted to neutral with 50% aqueous sodium hydroxide solution. The solution was heated to and maintained at 50° C., followed by the addition of 0.5 ml cedarwood oil (Fisher Scientific Co., Fair Lawn, N.J.). Subsequently, 100 grams of dry soy flour was slowly added with vigorous stirring, resulting in a viscous but smooth and homogenous solution.

Example 2

Preparation of a Phenol-Formaldehyde Cross-Linking Agent

The PF cross-linking agent was prepared by combining 1 mole phenol, 2.4 moles formaldehyde in 37% solution, and 0.1 mole NaOH in a 50% aqueous solution to form a mixture. The mixture was then heated at 75° C. for 60 minutes, followed by refluxing the mixture at 95° C. for 60 minutes to complete the reaction. The synthesized PF resin was slowly neutralized with 4N $H_2SO_4$ to a pH of 7 at room temperature, thereby obtaining the PF cross-linking agent.

A high formaldehyde to phenol molar ratio of 2.4:1 was used to prepare the PF cross-linking agent in order to obtain as many hydroxymethylol groups (—$CH_2OH$) as possible. The presence of hydroxymethylol groups enhances cross-linking of the protein and the carbohydrate in the soybean flour solution and, therefore, improves adhesion and moisture resistance of the adhesive bonds. A low sodium hydroxide to phenol ratio was used to promote hydroxymethylolation (Christiansen et al., "Differential Scanning Calorimetry of Phenol-Formaldehyde Resols," *J. Appl. Polymer Science*, 30:2279–2289 (1985), which is hereby incorporated by reference). Also, the use of a small amount of sodium hydroxide in the preparation of the PF cross-linking agent required a lesser amount of acid to neutralize the PF resin to a pH of 7 and thus avoided undesirable salts in the resin.

Before neutralizing with 4N $H_2SO_4$, the PF resin typically had a pH of 9.5, a solid content of approximately 50%, and a viscosity ranging from 50 to 70 centipoises (cps) at room temperature. Neutralization of this alkaline PF resin resulted in the separation of an organic layer from the aqueous layer. Separation of the organic layer would not occur during neutralization if the viscosity of the alkaline PF resin was below 30 cps, indicating that the phenolic moieties were water-soluble. These water-soluble phenolic alcohols cause extensive cross-linking of soy protein during formulation of the soybean-based adhesive resins, resulting in a granular paste as described by Lambuth, "Blood Glues," in *Handbook of Adhesives*, Skeist, ed., Reinhols Publishing Corp., NY (1962), which is hereby incorporated by reference.

Example 3

Preparation of a Soybean-Based Adhesive Resin

A soybean-based adhesive resin was formulated by cross-linking seven parts of soy flour with three parts of PF cross-linking agent in aqueous solution. More particularly, the soybean-based adhesive resin was prepared by vigorously blending the neutral PF cross-linking agent with the soybean flour solution at 50° C. for 10 minutes. After adding 50 ml of cold water, the mixture was blended for additional 5 minutes to complete the formulation of a liquid soybean-based adhesive resin.

Immediately after mixing, the mixture showed an increase in viscosity. The final dilution of the mixture with cold water lowered the viscosity, resulting in a sprayable resin. The soybean-based adhesive resin so formulated typically had a solid content of about 30 percent. The viscosity of this soybean-based adhesive resin could not be accurately determined, because there was foam in the resin. Viscosity of freshly prepared foamy resins ranged from 1000 to 2000 cps and increased to about 3000 cps in one hour. The cross-linking reactions would continue overnight, and the resin gelled after storing it at room temperature for about 48 hours. Therefore, the liquid soybean-based adhesive resin had a short potlife. However, these resins could be sprayed within about two hours after formulation with a 30-psi pressure during atomization.

The powder soybean-based adhesive resin was prepared by freeze-drying the liquid soybean-based adhesive resin, followed by double grinding of the dry mass with a hand-powered disk grinding mill.

Example 4

Fabrication of Fiberboard and Hardboard

Dry-formed medium-density fiberboard ("MDF") and hardboard were made from fiber furnishes containing equal parts of wood and cornstalk fibers. A commercial fiberboard furnish was obtained from MacMillan Bloedel Clarion, Shippenville, Pa. This mixed eastern hardwood fiberboard furnish was manufactured by a pressurized double-refining process. This refining process involved a steam pressure of 110 psi with a 0.003-inch plate clearance during the first pass, followed by a steam pressure of 100 psi with a 0.002-inch plate clearance during the second pass. Cornstalk fibers were prepared with an atmospheric disk refiner following a procedure outlined in Kuo et al., "Properties of Wood/Agricultural Fiberboard Bonded with Soybean-Based Adhesives," *Forest Products J.*, 48:71–75 (1998), which is hereby incorporated by reference.

Enough fiber furnish containing equal amounts of wood and cornstalk fibers at moisture contents ranging from 4 to 7 weight percent was mixed in a blender. The mixture was then sprayed, based on the dry weight of fibers, first with 1 percent of a wax emulsion (EW403H, Borden Chemical Inc., Springfield, Oreg.), followed by 12 percent of the soybean-based adhesive resin. The resulting fiberboard furnish had a moisture content ranging from 25 to 28 weight percent, depending upon the initial moisture content of wood and cornstalk fibers.

An exact amount of furnish was hand-felted into a forming box to make a 10-inch by 16-inch by ½-inch thick MDF at a target density of 46.8 pounds per cubic foot ("pcf"). Likewise, an exact amount of furnish was hand-felted into a 9-inch by 9-inch forming box to make a 9-inch by 9-inch by ⅛-inch thick hardboard at a target density of 62.4 pcf. The mat was cold pressed to reduce edge spreading during hot-pressing for a better control of board density. MDF boards were pressed at 177° C. with a press cycle of 5 minutes at maximum pressure, followed by a gradual release of pressure to provide a total press time of 15 minutes. Hardboards also were pressed at 177° C. but with a press cycle of 2 minutes at maximum pressure, followed by a gradual release of pressure to complete a total press time of 8 minutes. Three duplicate batches of fiberboard were prepared, and each batch contained two MDF boards and two hardboards.

Example 5

Fabrication of Fiberboard with Urea- and Phenol-Formaldehyde Resins

To compare the soybean-based adhesive resin of the present invention with urea-(UF) and phenol-formaldehyde (PF) resins, three batches of wood/cornstalk fiberboard with each tyke of resin were also made using commercial UF (Borden WC2 1, Borden Chemicals, Inc., Springfield, Oreg.) and PF (Borden 45 OS57H, Borden Chemicals, Inc., Springfield, Oreg.) resins. UF-bonded MDF boards were pressed at 141° C. with a 5-minute press cycle, while hardboards were pressed at the same temperature with a 3-minute cycle. PF-bonded MDF boards and hardboards were pressed at 177° C. with a 7-minute and 5-minute press cycle, respectively. The UF- and PF-bonded boards also contained 1% wax emulsion.

Example 6

Fabrication of Fiberboard and Hardboard Using a Liquid/Powder Soybean-Based Adhesive Resin MDF boards and hardboards were also made using a liquid/powder soybean-based adhesive resin combination of the present invention. In this method, 30 weight percent of the required amount of soybean-based adhesive resin was first sprayed onto the fiber furnish in the liquid form, followed by application of the remaining 70 weight percent of the soybean-based adhesive resin in the powder form. The resulting fiber furnish had a moisture content ranging from 11 to 14 weight percent, depending upon the initial moisture content of the fibers. The boards were fabricated as described above but with shorter press cycles. MDF boards were pressed at 177° C. with a press cycle of 4 minutes at the maximum pressure, followed by a gradual release of pressure to complete an 8-minute cycle. Hardboards were also pressed at 177° C., with a press cycle of 1.5 minutes at maximum pressure, followed by gradual release of pressure to complete a 5-minute cycle. These boards were post-cured in an insulated box overnight.

Example 7

Fabrication of Flakeboard

Flakeboards were made by using stems of several species of 7-year-old hybrid poplar. Hybrid poplar wood flakes, 2 to 3 inches in length, 0.020 inch in thickness, and in random width were prepared by a laboratory disk flaker. These flakes, at a moisture content about 6 weight percent, were sprayed with 1 weight percent wax emulsion and 7 weight percent of the soybean-based adhesive resin. An exact amount of furnish, having a moisture content of approximately 16 weight percent, was hand-felted into a 10-inch by 16-inch forming box at random orientation to make a 10-inch by 16-inch by ½-inch thick board with a target density of 40.6 pcf. The formed mat was pressed at 177° C. for 4 minutes at the maximum pressure, followed by gradual release of pressure to complete a 10-minute cycle. Three batches of flakeboards were fabricated, with each batch containing three boards. Similarly, three batches of flakeboards bonded with 5 weight percent of a commercial PF resin (Borden 45 OS57H, Borden Chemicals, Inc., Springfield, Oreg.) were made.

Flakeboards bonded with the liquid/powder soybean-based adhesive resin combination were also made. Similar to fiberboards made with this system as described above, 30 weight percent of the 7 weight percent soybean-based adhesive resin was first sprayed onto the flakes in liquid form, followed by application of the remaining 70 weight percent of the soybean-based adhesive resin in the powder form. The mats were pressed at 177° C. with a press cycle of 3 minutes at maximum pressure, followed by gradual release of pressure to complete a 7-minute press cycle. These boards also were post-cured in an insulated box overnight.

Example 8

Evaluation of Fiberboard and Flakeboard

After conditioning in an environment of 21° C. and 65 percent relative humidity for one week, hardboards were trimmed to 9-inch by 9-inch and MDF boards and flakeboards were trimmed to 9-inch by 14-inch, followed by a determination of the density of each board. Modulus of rupture ("MOR"), modulus of elasticity ("MOE"), and tensile strength perpendicular to surface (internal bonding strength, "IB") were determined according to procedures specified in ASTM Standard (American Society for Testing and Materials. Standard Methods for Evaluating the Properties of Wood-Based Fiber and Particle Panel Materials. ASTM Standard D1037–78. ASTM, West Conshohoken, Pa. (1978), which is hereby incorporated by reference). The static bending properties of the hardboard specimens were determined by using 2-inch by 4.5-inch specimens with a 3-inch span, and the bending properties of MDF and flakeboard specimens were determined by using 3-inch by 14-inch specimens with a 12-inch span. The 24-hour-soak and 2-hour-boil thickness swell measurements were determined by using 2-inch by 4.5-inch specimens from hardboard and 3-inch by 4.5-inch specimens from MDF and flakeboard.

A comparison of the four resins, including the soybean-based adhesive resins of the present invention, as binders of fibers to form medium-density fiberboard is shown below in Table 1.

liquid soybean-based adhesive resin had moderate face and edge screw withdrawal resistance values, but fiberboards formed from fibers bonded with soybean-based adhesive

TABLE 1

Physical properties of medium-density fiberboard containing equal parts of wood and cornstalk fibers bonded with different resin adhesives.

| Resin Type | Resin solids (%)[1] | Density (pcf)[2] | MOR (psi) | MOE (1000 psi) | IB (psi) | Screw Withdrawal Face (pound/inch)[3] | Screw Withdrawal Edge (pound/inch)[3] | 24-hr Soak Th. Swell (%) | 2-hr Boil Th. Swell (%) |
|---|---|---|---|---|---|---|---|---|---|
| UF (commercial) | 12 | 48.0 | 3962 (B)[4] | 470 (B) | 61 (B) | 537 (A) | 268 (B) | 15.8 (B) | failed |
| STDEV[5] | | | 16.3 | 4.3 | 22.6 | 18.5 | 0.5 | | |
| COV (%)[6] | | | 263.0 | 3.5 | 8.2 | 4.2 | 6.9 | 3.2 | 6.6 |
| PF (commercial | 12 | 46.2 | 5376 (A) | 543 (A) | 93 (A) | 345 (B) | 332 (A) | 5.3 (A) | 23.3 (A) |
| STDEV | | | 624.1 | 21.3 | 22.3 | 61.1 | 39.6 | 0.6 | 1.7 |
| COV (%) | | | 11.6 | 3.9 | 24.1 | 17.7 | 11.9 | 11.9 | 7.1 |
| Soy-based A[7] | 12 | 48.0 | 4065 (B) | 462 (B) | 80 (AB) | 323 (B) | 195 (B) | 5.8 (A) | 35.4 (B) |
| STDEV | | | 458.7 | 46.6 | 16.2 | 96.9 | 71.1 | 0.8 | 4.2 |
| COV (%) | | | 11.3 | 10.1 | 20.3 | 30.1 | 36.5 | 13.0 | 11.8 |
| Soy-based B[8] | 12 | 48.0 | 3843 (C) | 454 (B) | 39 (C) | 310 (B) | 90 (C) | 14.5 (B) | 50.2 (C) |
| STDEV | | | 294.8 | 2.32 | 4.2 | 15.6 | 18.8 | 5.6 | 3.1 |
| COV (%) | | | 7.7 | 5.1 | 10.8 | 5.2 | 20.8 | 38.3 | 6.2 |

[1]Percent resin solids based on dry weight of fiber; boards also contained 1% wax emulsion.
[2]Pounds per cubic foot.
[3]Force required to extract a 0.186-inch diameter screw penetrated 1 inch into board.
[4]Means with the same letters are not significantly different from each other at the 5% level.
[5]Standard deviation.
[6]Coefficient of variation.
[7]Soybean-based adhesive resin sprayed as a liquid resin.
[8]Soybean-based adhesive resin with 30% sprayed in liquid form and 70% applied in powder form.

These results indicate that fiberboards formed from fibers bonded with PF resin had the highest MOR, MOE, and IB. Fiberboards formed from fibers bonded with UF resin and liquid soybean-based adhesive resin (Soy Resin A, Table 1) had comparable MOR, MOE, and IB values, but fiberboards bonded with the soybean-based adhesive resin of the present invention in the liquid/powder combination (Soy Resin B, Table 1) had the lowest values. Fiberboards formed from PF-bonded fibers also had the best dimensional stability, followed by fiberboard formed from fibers bonded with the liquid soybean-based adhesive resin, soybean-based adhesive resin in the liquid/powder combination, and UF resin. Fiberboards formed from UF-bonded fibers had the highest face screw withdrawal resistance value, but PF-bonded boards had the highest edge screw withdrawal resistance value. Fiberboards formed from fibers bonded with the resin in the liquid/powder combination had the lowest edge screw withdrawal resistance value.

Table 2, below, shows that all four resins produced hardboards with comparable MOR and MOE values. However, boards formed from fibers bonded with PF and the liquid soybean-based adhesive resin of the present invention had higher IB values than boards formed from fibers bonded with UF resin and soybean-based adhesive resin in the liquid/powder combination. Table 2 also shows that hardboard formed from PF-bonded fibers had the best dimensional stability, followed by hardboard bonded with the liquid soybean-based adhesive resin of the present invention, soybean-based adhesive resin in liquid/powder combination, and UF resin.

TABLE 2

Physical properties of hardboard containing equal parts of wood and cornstalk fibers bonded with different resin adhesives.

| Resin Type | Resin solids (%)[1] | Density (pcf)[2] | MOR (psi) | MOE (1000 psi) | IB (psi) | 24-hr Soak Th. Swell (%) | 2-hr Boil Th. Swell (%) |
|---|---|---|---|---|---|---|---|
| UF (commercial) | 12 | 463.8 | 7563 (A)[3] | 666 (A) | 167 (B) | 22.0 (D) | failed |
| STDEV[4] | | | 983.2 | 113.4 | 4.3 | 0.5 | |
| COV (%)[5] | | | 13.0 | 17.0 | 2.6 | 2.1 | |
| PF (commercial | 12 | 63.2 | 7580 (A) | 802 (A) | 194 (A) | 11.1 (A) | 20.0 (A) |
| STDEV | | | 809.5 | 106.2 | 10.9 | 1.0 | 3.3 |
| COV (%) | | | 10.7 | 13.2 | 5.6 | 8.6 | 16.3 |
| Soybased A[6] | 12 | 62.9 | 7259 (A) | 660 (B) | 187 (AB) | 15.9 (A) | 23.1 (B) |
| STDEV | | | 641.2 | 106.3 | 20.2 | 0.9 | 2.6 |
| COV (%) | | | 8.8 | 16.1 | 10.8 | 5.5 | 11.4 |
| Soy-based B[7] | 12 | 48.0 | 6447 (A) | 669 (A) | 120 (C) | 18.6 | 51.7 (B) |
| STDEV | | | 194.7 | 117.6 | 19.1 | 2.7 | 6.2 |

TABLE 2-continued

Physical properties of hardboard containing equal parts of wood and cornstalk fibers bonded with different resin adhesives.

| Resin Type | Resin solids (%)[1] | Density (pcf)[2] | MOR (psi) | MOE (1000 psi) | IB (psi) | 24-hr Soak Th. Swell (%) | 2-hr Boil Th. Swell (%) |
|---|---|---|---|---|---|---|---|
| COV (%) | | | 14.2 | 17.6 | 15.9 | 14.4 | 11.9 |

[1]Percent resin solids based on dry weight of fiber; boards also contained 1% wax emulsion.
[2]Pounds per cubic foot.
[3]Means with the same letters are not significantly different from each other at the 5% level.
[4]Standard deviation.
[5]Coefficient of variation.
[6]Soybean-based adhesive resin sprayed as a liquid resin.
[7]Soybean-based adhesive resin with 30% sprayed in liquid form and 70% applied in powder form.

Table 3 shows that except for having a significantly lower MOE value, the mechanical properties and dimensional stability of flakeboard formed from flakes bonded with 7 weight percent of the liquid soybean-based adhesive resin of the present invention (Soy Resin A, Table 3) were comparable to those of the board bonded with 5 weight percent PF resin. Similar to the fiberboard results, flakeboard formed from flakes bonded with the soybean-based adhesive resin in the liquid/powder combination (Soy Resin B, Table 3), was inferior to boards bonded with the liquid soybean-based adhesive resin and PF resin.

TABLE 3

Physical properties of 7-year-old hybrid poplar flakeboard bonded with PF resin and soybean-based adhesive resin.

| Resin Type | Resin solids (%)[1] | Density (pcf)[2] | MOR (psi) | MOE (1000 psi) | IB (psi) | 24-hr Soak Th. Swell (%) | 2-hr Boil Th. Swell (%) |
|---|---|---|---|---|---|---|---|
| UF (commercial) | 5 | 4308 | 6495 (A)[3] | 744 (A) | 80 (B) | 46.4 (D) | failed |
| STDEV[4] | | | 670 | 14 | 1.5 | 4.6 | |
| COV (%)[5] | | | 10.3 | 17.5 | 19.7 | 9.9 | |
| Soy-based A[6] | 7 | 40.6 | 6200 (A) | 621 (B) | 71 (A) | 8.9 (A) | 55.3 (B) |
| STDEV | | | 519 | 81 | 2.7 | 2.2 | 8.0 |
| COV (%) | | | 8.4 | 13.1 | 3.7 | 25.2 | 14.4 |
| Soy-based B[7] | 7 | 43.1 | 5133 (B) | 629 (B) | 44 (B) | 51.1(B) | 101.6(B) |
| STDEV | | | 400 | 71 | 6.6 | 4.6 | 42 |
| COV (%) | | | 7.8 | 11.9 | 16.1 | 9 | 4 |

[1]Percent resin solids based on dry weight of fiber; boards also contained 1% wax emulsion.
[2]Pounds per cubic foot.
[3]Means with the same letters are not significantly different from each other at the 5% level.
[4]Standard deviation.
[5]Coefficient of variation.
[6]Soybean-based adhesive resin sprayed as a liquid resin.
[7]Soybean-based adhesive resin with 30% sprayed in liquid form and 70% applied in powder form.

These results indicate that medium-density fiberboard formed from fibers bonded with soybean-based adhesive resin have comparable mechanical properties and superior dimensional stability compared to boards formed from fibers bonded with commercial urea-formaldehyde (UF) resins. Compared with boards formed from fibers bonded with commercial phenol-formaldehyde (PF) resins, medium-density fiberboard formed from fibers bonded with soybean-based adhesive resin have weaker mechanical properties but are comparable in dimensional stability. The moisture resistance of medium-density fiberboard formed from fibers bonded with soybean-based adhesive resin is superior to UF-bonded boards and equivalent to PF-bonded boards.

Hardboard and flakeboards formed from fibers and flakes bonded with the soybean-based adhesive resin have mechanical and dimensional properties equivalent to those of boards bonded with PF resin, with an exception of a 16.5 percent lower modulus of elasticity for flakeboards. Hardboards formed from fibers bonded with soybean-based adhesive resin are superior to UF-bonded boards in mechanical and dimensional properties. Flakeboards formed from flakes bonded with soybean-based adhesive resin are equivalent to PF-bonded boards in moisture resistant properties. The soybean-based adhesive resin produces fiberboard and flakeboard with satisfactory mechanical properties and a dimensional stability comparable to that of boards formed from fibers bonded with PF resin. Therefore, the soybean-based adhesive resin of the present invention can replace UF resin for the production of fiberboard panels for interior applications to alleviate the formaldehyde emission and poor moisture resistance problems. The soybean-based adhesive resin also can be used as exterior adhesive resin for the production of construction grade wood composites. The soybean-based adhesive resin has a cost of about 50 percent less than PF resin and 50 percent higher than UF resins.

Example 9

Fabrication of Compression Molded Products with Powder Soybean-Based Adhesive Resin Air-dried soybean stalks were processed with a Wiley Mill to obtain fine particles that passed a 50-mesh screen. The soybean stalk particles were conditioned to have 4% moisture content, followed by mixing the particles with 25 weight percent of powdered soybean-based adhesive resin. A predetermined amount of the particle/resin mixture, depending on the desired density of the product, was poured into a mold and compressed at 195° C. for ten minutes.

The physical properties of the resulting compression molded panels made from soybean stalk particles and bonded with powdered soybean-based adhesive resin of the present invention are shown in Table 4, below:

TABLE 4

Physical properties of compression molded panels using powdered soybean-based adhesive resin as the binder for soybean stalk particles.

| Resin | | | MOE | | 50% RH to 90% RH[1] | |
| --- | --- | --- | --- | --- | --- | --- |
| Solids (%) | Density (pcf) | MOR (psi) | (1000 psi) | IB (psi) | ADS (%) | TS (%) |
| Average 25 | 54.8 | 1738 | 341 | 90 | 12.53 | 6.85 |
| STDEV[2] | 0.73 | 216.8 | 36.4 | 18.9 | 0.65 | 1.11 |
| COV (%)[3] | 1.33 | 12.47 | 10.67 | 21.00 | 5.19 | 16.20 |

[1]Dimensional changes from 50% relative humidity to 90% relative humidity at 21° C. ADS = moisture adsorption; TS = thickness swell.
[2]Standard deviation.
[3]Coefficient of variation.

The soybean stalk particles were bonded with 25 weight percent of powder soybean-based adhesive resin and compression molded to a density of 54.8 pcf. These panels had average MOR, MOE, and IB values of 1,738 psi, 341,000 psi, and 90 psi, respectively. When samples of these compression molded panels were conditioned in a humidity chamber from 50% relative humidity at 21° C. to 90% relative humidity at the same temperature, the samples gained 12.5% moisture and had a 6.85% thickness swell.

Although the invention has been described in detail for the purpose of illustration, it is understood that such detail is solely for that purpose, and variations can be made therein by those skilled in the art without departing from the spirit and scope of the invention which is defined by the following claims.

What is claimed is:

1. A soybean-based adhesive resin comprising:
   a soybean flour and
   a phenol-containing cross-linking agent, wherein said phenol-containing cross-linking agent reacts with functional groups in the soybean flour to form an adhesive resin.

2. A soybean-based adhesive resin according to claim 1, wherein said phenol-containing cross-linking agent is a phenol-formaldehyde resin.

3. A soybean-based adhesive resin according to claim 1, wherein said soybean flour is defatted.

4. A soybean-based adhesive resin according to claim 1, wherein the ratio of the soybean flour to the phenol-containing cross-linking agent is from about 8:2 to 6:4.

5. A method of making a soybean-based adhesive resin comprising:
   providing an aqueous solution of soybean flour and
   adding a phenol-containing cross-linking agent to the solution under conditions effective to cross-link said soybean flour and said phenol-containing cross-linking agent to form an adhesive resin.

6. A method according to claim 5, wherein said phenol-containing cross-linking agent is a phenol-formaldehyde resin.

7. A method according to claim 5, wherein said soybean flour is defatted.

8. A method according to claim 5, wherein said soybean flour is prepared by a method comprising:
   dissolving sodium bisulfite in an aqueous solution;
   adjusting the pH of the aqueous solution to about 6.8 to 7.1;
   heating the aqueous solution to about 45° C. to 55° C.;
   adding a defoamer to the aqueous solution; and
   adding dry soy flour to the aqueous solution under conditions effective to produce a homogenous solution.

9. A method according to claim 5, wherein said phenol-containing cross-linking agent is prepared by a method comprising:
   combining phenol, formaldehyde, and sodium hydroxide to form a mixture;
   heating the mixture;
   refluxing the mixture; and
   neutralizing the mixture to a pH of about 6.8 to about 7.1.

10. A method according to claim 5, further comprising:
    freeze-drying said soybean-based adhesive resin and
    grinding said freeze-dried soybean-based adhesive resin under conditions effective to form a powder soybean-based adhesive resin.

* * * * *